3,775,397
NOVEL CYCTOSTATIC 2',3'-DIDEOXY-3'-FLUORO-
PYRIMIDINE-NUCLEOSIDES
Gerhard Etzold, Rainer Hintsche, and Peter Langen,
Berlin, Germany, assignors to Deutsche Akademie der
Wissenschaften zu Berlin, Berlin-Adlershof, Germany
No Drawing. Filed Nov. 12, 1969, Ser. No. 876,068
Int. Cl. C07d 51/52
U.S Cl 260—211.5 R                          3 Claims

ABSTRACT OF THE DISCLOSURE

Novel 2',3'-dideoxy - 3' - fluoro-pyrimidine-nucleosides characterized by cytostatic activity having the formula:

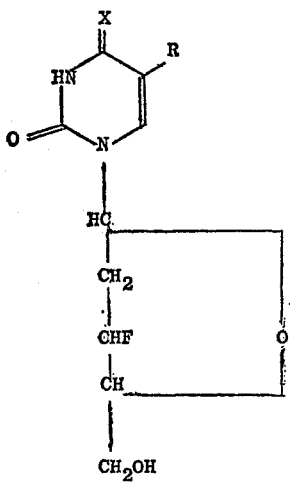

wherein X designates O, S or NH and R designates hydrogen, alkyl, substituted alkyl, halogen, OH or SH, and a process of preparing the same by reacting a corresponding at the oxygen of the 3'-OH group substituted pyrimidine nucleoside with a fluorinating agent.

---

This invention relates to novel 2',3'-dideoxy-3'-fluoropyrimidine-nucleosides and to a method of preparing the same.

More particularly, this invention relates to cytostatically active 2',3'-dideoxy - 3' - fluoro-pyrimidine-nucelosides having the formula:

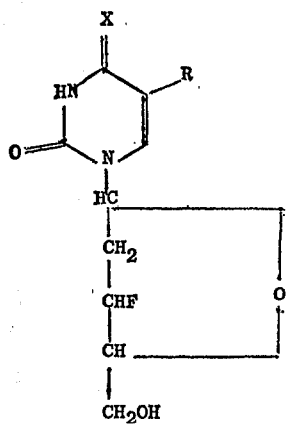

wherein X designates O, S or NH and R designates hydrogen, alkyl, substituted alkyl, halogen, OH or SH, to processes of making and using the same.

2',3'-dideoxy-nucleosides as characterized by the Formula I have heretofore not been produced. For the preparation of nucleosides having fluorine containing sugar components, there exist in principle two possible methods:

(a) condensation of a reactive fluoro-sugar derivative with a pyrimidine or purine base;
(b) introduction of fluorine into the intact nucleoside.

Prior to the instant invention, by utilizing procedure (a), there were prepared only 5'-deoxy-5'-fluoro- and 3'-deoxy-3'-fluoro-nucleosides containing an OH group on the C-2' atom. Utilizing procedure (b), there have until the present, been prepared only 5'-deoxy-5'-fluoro-nucleosides by the reaction of 5'-O-sulfonyl derivatives with fluorides, 2'-deoxy-2'-fluoro-nucleosides through the $H_2F_2$ splitting of cyclonucleosides and deoxy-2'-fluoro- and 3'-deoxy-3'-fluoro-derivatives from 2',3'-epoxides.

In connection with the preparation of 2',3'-dideoxy-3'-fluoro-nucleosides, method (a) has the disadvantage that the 2-deoxy sugars lack the directional influence of a 2-OH group so that there are always formed mixtures of anomeric nucleosides, the classification and separation of which give rise to considerable difficulties. The reactions which come within the scope of procedure (b) including the direct exchange of an O-sulfonyl group with the fluoride are also not useable, because of the limited reactivity of the secondary C-atom, and also the 2',3'-epoxide splitting is not useful for the preparation of 2',3'-dideoxy-3'-fluoro-nucleosides. The introduction of fluorine into the intact nucleoside by splitting of the cyclonucleoside with $H_2F_2$ has proved successful only with $O^2,2'$-cyclo-derivatives of 2'-hydroxypyrimidine-nucleosides as their N-glycosidic linkages in contrast to that of the 2'-deoxy-nucleosides and their derivatives are very stable against acids.

It is an object of the invention to provide a simple method for the preparation of novel 2',3'-dideoxy-3'-fluoro-pyrimidine-nucleosides.

The above object is accomplished in accordance with one aspect of the invention by heating a pyrimidine-$O^2,3'$-cyclo-2'-deoxy-nucleoside in an organic solvent, preferably an ether such as dioxane or tetrahydrofuran, which can contain up to 20% and preferably from 4 to 6% anhydrous hydrogen fluoride, or 0.1–1% hydrogen fluoride in the presence of a metal fluoride preferably aluminum fluoride for from 15 minutes up to several hours and preferably for from 30 to 120 minutes, to 60–150° C. and preferably to 80 to 130° C. Thereafter the excess hydrogen fluoride is neutralized with a suitable compound, as for example, $CaCO_3$. If necessary the $CaF_2$ which is formed, is then separated off. The solvent is then driven off in vacuum and the resulting compound purified by crystallization or column chromatography.

In accordance with a further embodiment of the invention, a pyrimidine-$O^2,3'$-cyclo-2'-deoxy-nucleoside in an organic solvent, preferably a mono or polyvalent alcohol, such as methanol, ethanol, glycol, or diethylene glycol, is heated for from 1 to 10 hours, and preferably for from 1–2 hours with an inorganic fluoride, such as $KHF_2$ or $NH_4F$ to a temperature of about 130–230° C. Thereafter the solvent is driven off in vacuum and the remaining product purified by subjecting it to column chromatography, for example on Celite. In place of the pyrimidine-$O^2,3'$-cyclo-2'-deoxy-nucleoside, there can also be used according to the invention, a compound, the 3'-OH group of which is sulfonylated, for example a mesylated-pyrimidine-nucleoside, which under the given reaction condition is first converted into the intermediate $O^2,3'$-cyclo-2'-deoxy-nucleoside.

The process according to the invention provides a simple and convenient method for preparing the heretofore unknown, i.e., unavailable 2',3'-dideoxy-3'-fluoro-pyrimidine-nucleosides. The reaction proceeds, depending on the specific conditions, to provide excellent yields of the desired compound. A special advantage of the introduction of fluorine into the intact nucleoside lies in that the glucosidic linkage thereby remains unchanged so that the structures of the reaction products in this respect are consistent, i.e., uniform. Protective groups on other OH groups of the sugar residue which do not give rise to cyclonucleosides in the process can be present on the starting materials if necessary or desired. Such groups, as for instance, trityl groups do not have any influence on the reaction according to the invention.

The 2',3'-dideoxy-3'-fluoro-pentofuranosyl-pyrimidine-nucleoside prepared according to the invention has been found to exhibit a most surprising and potent cytostatic activity.

The invention will be further illustrated by the following examples, the same are however, in no wise to be constructed as limiting the scope thereof.

EXAMPLE 1

1 g. 3'-O-mesyl-thymidine and 10 g. $KHF_2$ in 100 cm.$^3$ diethylene glycol were heated in a preheated bath for 90 minutes to 190° C. (bath temperature). The solvent was then separated off in vacuum (oil pump, bath temperature up to max. 140° C.) and the residue after addition of 3 cm.$^3$ hot water admixed with 10 g. Celite. The resulting mixture was applied onto a chromatographic column (3.6 x 83 cm.) containing 400 g. Celite/120 cm.$^3$ water and eluted with water saturated with acetic ester. The fractions 6–18 (each 10 cm.$^3$) contain chromatographically pure 1 - (2'3' - dideoxy-3'-fluoro-$\beta$-D-pentofuranosyl)-thymine, which after concentration in vacuum and possible steam distillation with absolute ethanol crystallizes out. The yield amounted to 106 mg. The melting point, after recrystallization from water or acetic ester/ petroleum ether and drying (100° C., 1 torr, $P_2O_5$) was 176–177° C.

On 0.25 mm. silica gel HF-thin layer with water saturated acetic ester $R_F$-value 0.41.

UV—absorption in $H_2O$: $\lambda_{max}$. 265.5 nm.:

$\lambda_{min}^{max}$. 234 nm.; in 0.1 N NaOH: $\lambda_{max}$. 266 nm., $\lambda_{min}^{max}$. 245 nm.

The compound is converted through heating with watery alcoholic soda hydroxide (16 hours, reflux) substantially completely into 2',3'-didehydro-3'-deoxy-thymidine.

For example 1 - (2',3'-dideoxy-3'-fluoro-$\beta$-D-pentofuranosyl)thymine inhibits very markedly in vitro both the DNA-synthesis and the multiplication of Ehrlich ascites tumour cells of the mouse (systems according to Negelein et al. and Langen and Kowollik). There is a complete or 50% inhibition of the multiplication of the cells in vitro at concentrations of 10 or 0.16 $\mu$M., respectively (see Table 1). Growing *Escherichia coli* in 0.1 mM. of the compound results in the formation of inhibition of the multiplication and or the formation of filamentous forms.

TABLE 1.—INFLUENCE OF 3'-FLUOROTHYMIDINE ON THE MULTIPLICATION OF CARCINOMA CELLS IN VITRO

[Incubation time 24 hours]

| 3'-fluorothymidine concentration, mM. | Cell number X10$^5$ | | Change, percent |
|---|---|---|---|
| | Initial | Final | |
| 0 | 1.69 | 3.52 | +108 |
| 0.003 | 1.69 | 2.31 | +37 |
| 0.01 | 1.69 | 1.79 | +6 |
| 0.03 | 1.69 | 1.53 | −9 |
| 0.10 | 1.69 | 1.57 | −7 |
| 0.3 | 1.69 | 1.34 | −20 |
| 0 | 2.64 | 5.56 | +111 |
| 0.00003 | 2.64 | 4.88 | +86 |
| 0.0001 | 2.64 | 4.26 | +62 |
| 0.0003 | 2.64 | 3.84 | +46 |
| 0.001 | 2.64 | 3.56 | +35 |
| 0.003 | 2.64 | 3.17 | +21 |

EXAMPLE 2

As described in Example 1, 1 g. of 3'-O-mesylthymidine and 10 g. of $NH_4F$ are heated in diethylene glycol for 90 minutes to 190° C. Yield of 1-(2',3'-dideoxy-3'-fluoro-$\beta$-D-pentofuanosyl)thymine: 100–110 mg.

EXAMPLE 3

900 mg. $O^2$,3'-cyclo-1-(2'-deoxy-$\beta$-D-xylofuranosyl) thymine were heated as described in Example 1 with 10 g. $KHF_2$ in diethylene glycol for 10 minutes to 190° C. or in ethanol in a bomb tube for 20 hours to 150° C., and then further worked up as set out in Example 1. The yield amounted to 100–120 mg. of 1-(2',3'-dideoxy-3'-fluoro-$\beta$-D-pentofuranosyl)thymine having the same properties as set out in Example 1.

EXAMPLE 4

900 mg. $O^2$,3' - cyclo-1-(2'-deoxy-$\beta$-D-xylofuranosyl) thymine were heated as described in Example 1 with 10 g. $NH_4F$ in diethylene glycol for 10 minutes to 190° C. and then further worked up as set out in Example 1. The yield amounted to 100–120 mg. of 1-(2',3'-dideoxy-3'-fluoro-$\beta$-D-pentofuranosyl)thymine.

EXAMPLE 5

330 mg. $O^2$,3' - cyclo-1-(2'-deoxy-$\beta$-D-xylofuranosyl) thymine were heated with 30 cm.$^3$ of a solution of 4–6% hydrogen fluoride in anhydrous dioxan in a sealed nickel or steel vessel for 45 minutes to 90° C. (bath temperature). The cooled solution, following the addition of some water was neutralized with calcium carbonate or sodium hydrogencarbonate and the inorganic precipitate thereby formed centrifuged off and washed with large amounts of acetone. The combined solutions were concentrated in vacuum to dryness. The residue was subjected to column chromatography as described in Example 1 for purification. There were obtained 165 mg. of 1-(2',3'-dideoxy-3'-fluoro-$\beta$-D-pentofuranosyl)thymine having the properties as set out in Example 1.

EXAMPLE 6

290 mg. $O^2$,3' - cyclo-1-(2'-deoxy-5'-O-trityl-$\beta$-D-xylofuranosyl)thymine were reacted with 25 cm.$^3$ of a 4 percent solution of hydrogen fluoride in anhydrous dioxan as set out in Example 5 for 90 minutes at 80° C. The solution which was obtained was worked up as in Example 1 and the 1 - (2',3'-dideoxy-3'-fluoro-$\beta$-D-pentofuranosyl) thymine thereby recovered isolated by column chromatography. The yield amounted to 95 mg. The product had the same properties as the product of Example 1.

EXAMPLE 7

200 mg. $O^2$,3'-cyclo-1-(2'-deoxy-$\beta$-D-xylofuranosyl)uracil were suspended in 280 cm.$^3$ of a solution of 0.1% hydrogen fluoride in dioxan in the presence of 200 mg. anhydrous aluminum fluoride and heated for 90 minutes to 150° C. (bath temperature). The cooled mixture is then further worked up as set out in Example 5. After centrifugation or filtration the residue of the concentrated solution is purified by chromatography at silica gel using ethylacetate as solvent. The second UV-absorbing effluant contained 1-(2',3'-dideoxy - 3' - fluoro-$\beta$-D-pentofuranosyl) uracil. After recrystallization from ethylacetate the compound is melting at 190° C. Yield 90–100 mg.

What is claimed is:

1. A 2',3'-dideoxy-3'-fluoro-pyrimidine-nucleoside of the formula:

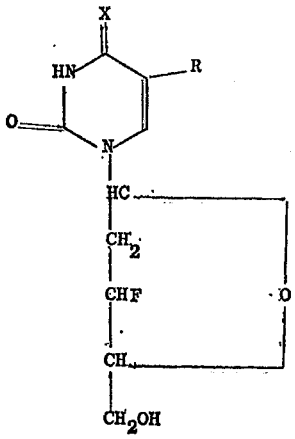

wherein X is O, S, or NH and R is hydrogen, methyl, halogen, OH or SH.

2. The 2',3'-dideoxy-3'-fluoro-pyrimidine-nucleoside of claim 1 which is 1-(2',3'-dideoxy-3'-fluoro-β-D-pentofuranosyl)thymine.

3. The 2',3'-dideoxy-3'-fluoro-pyrimidine-nuceloside of claim 1 which is 1-(2',3'-dideoxy-3'-fluoro-β-D-pentofuranosyl)-uracil.

References Cited

UNITED STATES PATENTS

| | | | |
|---|---|---|---|
| 3,562,250 | 2/1971 | Langen et al. | 260—211.5 R |
| 3,282,921 | 11/1966 | Verheyden et al. | 260—211.5 R |

FOREIGN PATENTS

| | | | |
|---|---|---|---|
| 13,214 | 6/1968 | Japan | 260—211.5 R |

OTHER REFERENCES

Stanek: "The Monosaccharides," Academic Press, New York, N.Y., 1963, pp. 198, 199, 242 and 243.

LEWIS GOTTS, Primary Examiner

J. R. BROWN, Assistant Examiner

U.S. Cl. X.R.

424—180